United States Patent Office 3,151,603
Patented Oct. 6, 1964

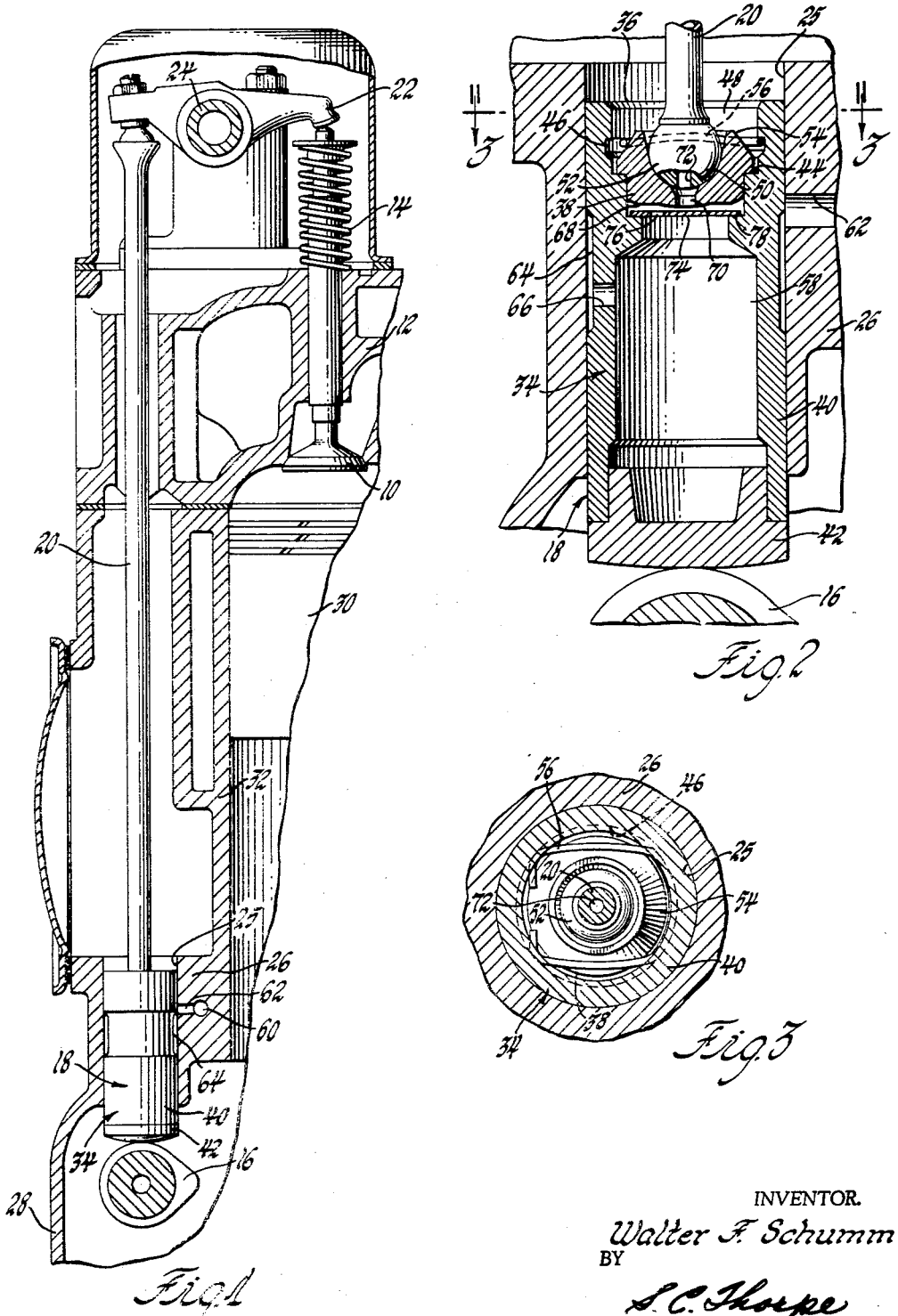

3,151,603
SNAP RING RETAINER MEANS
Walter F. Schumm, Grand Rapids, Mich., assignor to General Motors Corporation, Detroit, Mich., a corporation of Delaware
Filed Mar. 20, 1963, Ser. No. 266,531
5 Claims. (Cl. 123—90)

This invention relates to retainer means for securing parts together in assembly, and particularly where it is desired to bias them against relative movement, as for example to retain the push rod seat in abutting engagement with its supporting shoulder in a valve lifter of an internal combustion engine.

A common form of such retainer means is the so called "snap ring" made of spring wire and shaped generally in the form of a rectangle, whose ends engage a groove or shoulder in the bore of one part of an assembly and whose sides overlie the end of another part slidably fitting within the bore so as to limit their relative endwise movement in one direction. Such snap rings often coact with a limiting means such as a shoulder in the bore to prevent relative movement in any direction between secured parts, but manufacturing tolerances for mass produced assemblies often "build up," i.e. the assembly has an accumulation of parts that are made within their tolerances but in which all of the parts are made either to the high or the low limits, so that an ordinary snap ring positioned in its groove would not always secure the parts in abutting engagement.

With this invention, in order to allow for manufacturing tolerance build up, the end of the part contacted by the sides of the snap ring is sloped and the snap ring bendingly engages the sloped surface to urge the part into abutting engagement. The arrangement has particular advantage where it is desired to employ mechanical lifters in lubricating systems of the type shown in U.S. patent to Papenguth 2,818,050 wherein the oil is under pressure in the lifter and flows through an opening in the push rod seat.

Such a "mechanical" valve lifter, i.e. one that does not automatically take up the valve lash, in common use today comprises a generally cup-shaped cylinder which is slidably reciprocable in a bore provided therefore in the engine crank case so as to contact the engine driven cam, and a separately formed member or push rod seat which is thrustably supported on a shoulder in the open end of the cylinder and serves to transmit movement of the valve lifter to the push rod. A poppet valve return spring normally biases the push rod into contact with the seat, thus biasing the seat against its supporting shoulder, but during lash or lost motion between the valve lifter and cam, the seat does not have a constant biasing pressure urging it against its supporting shoulder. If the seat is not biased into continuous engagement with its supporting surface, excessive oil leakage could occur therebetween during the lost motion or lash period.

Whereas, hydraulic valve lifters, as shown in the Papenguth patent, have a plunger return spring which both automatically takes up the lash and cooperates with the poppet valve return spring in continuously maintaining oil sealing contact between the push rod seat and the plunger, mechanical lifters have no such plunger or plunger return spring to provide the oil sealing function. It is, therefore, an object of this invention to employ a resilient snap ring for retaining the push rod seat in a novel manner which also performs the oil sealing function of the plunger return spring in a hydraulic valve lifter.

Another and somewhat broader object of the present invention is to provide a resilient retainer means that will flex about a curved surface on one member and bias the one member in abutting engagement with a surface or shoulder of a second member for effectively restraining relative movement therebetween.

These and other objects of this invention will become more apparent as reference is had to the enclosed drawings and the following specification wherein:

FIGURE 1 is a transverse view of a portion of an internal combustion engine showing its poppet valve operating linkage which includes a "mechanical" lifter utilizing the present invention.

FIGURE 2 is an enlarged view of a portion of FIGURE 1 showing the parts of the lifter in longitudinal section and illustrating the novel resilient retaining means for the push rod seat.

FIGURE 3 is a view taken substantially along line 3—3 of FIGURE 2 with portions cut away, showing the resilient retaining means engaging the curved surface of the push rod seat.

Referring now to the drawings, in FIGURES 1 and 2, there is shown a poppet valve 10 mounted for reciprocation in the cylinder head 12 of an internal combustion engine. The poppet valve is reciprocably actuated by a return spring 14 opposing its movement from the closed position shown when the engine driven actuator or cam 16 raises the valve lifter 18 and push rod 20 to rotate the rocker 22 about its shaft 24. The lifter, in accordance with conventional engine design practice, is slidably supported in a bore 25 formed in a shelf 26 located just above the engine crank case 28. A piston 30 of the engine is shown in its working cylinder 32 formed in the upper portion of the crank case 28.

As shown in FIGURE 2, the lifter 18 comprises an assembly of a cup-shaped cylinder member 34 having an open end 36, in which is received the lower end of the push rod 20 and the push rod seat 38 by which thrust is transmitted between a lifter cylinder 34 and the push rod during engine operation.

The particular lifter cylinder 34 illustrated is comprised of a generally tubular wall portion 40 and a foot 42 which are made separately and permanently secured together by conventional means. The tubular wall portion 40 is provided with an internal shoulder 44 below its open end 36 which thrustably supports the push rod seat 38. A holding means in the form of a groove 46 is located in the bore or internal wall surface 48 between the shoulder 44 and the open end 36. The push rod seat 38 has a central seating portion 50 which may be spherically concave as shown to socket the correspondingly shaped end 52 of the push rod 20. Surrounding and extending radially from the socketing portion is a conically sloped surface 54 which extends to the periphery of the seat. The push rod seat 38 loosely fits the bore surface 48 of the lifter cylinder and is adapted to overlie and abut the shoulder 44.

A resilient retainer means in the form of a snap ring 56 extends transversely of the open end 36 and is flexed from its normal shape to resiliently bear against the groove 46 and the conical surface 54 to bias the seat 38 into abutting engagement with the shoulder 44. As can best be seen in FIGURE 3, the snap ring 56 is generally rectangular in shape and when in biasing position has portions of its edge coacting with the groove 46 while the sides of the rectangle bendingly contact the curved surface 54 of the seat.

The interior of the valve lifter 18 forms an oil reservoir chamber 58 for supplying oil to lubricate the poppet valve linkage. Oil is supplied under pressure to the chamber 58 through an oil gallery 60 connected to the oil pump of the engine (not shown). From the gallery 60, the oil flows through a passage 62 into an area formed by bore 25 and an external groove 64 on the lifter and thence through a port 66 into the chamber 58.

The lower surface 68 of seat 38 forms a wall defining the upper limits of said chamber. Centrally of the push rod seat 38, an outlet port 70 is connected to the central seating portion 50 and to an opening 72 in the end 52 of the hollow push rod 26 socketed therein.

A plate-like valve 74 having an aperture 76 therein rests on a shoulder 78 spaced inwardly of surface 68. This particular valve and its metering action form no part of this invention it being sufficient to point out that the valve is intended to control the rate of oil flow ino the push rod from the chamber 58 similar to that in the aforesaid Papenguth patent.

In operation, the return spring 14 exerts a sufficient biasing force upon the seat 38 to hold it in oil sealing contact with its supporting shoulder 44 during the lift portion of the cam cycle. During lost motion or lash of the mechanical lifter in the dwell portion of the cam cycle, the biasing force of the return spring is not present upon the seat 38 and the flexed snap ring 56 provides the thrust to restrict movement of the seat and maintain the biasing force upon the seat for oil sealing contact with shoulder 44.

While but one embodiment of the invention has been shown and described, it will be evident that numerous changes and modifications may be made. It is, therefore, to be understood that it is not intended to limit the invention to the embodiments shown but only by the scope of the following claims.

I claim:

1. In a valve lifter for transmitting valve operating thrust from an actuator to a push rod, a generally cup-shaped member having its open end adapted to receive the adjacent end of the push rod, a seat having a push rod seating portion and a sloped surface adjacent the push rod seating portion, seat support means within said cup-shaped member, said cup-shaped member having holding means on its inside surface between said seat support means and said open end, a resilient retainer means having end portions and intermediate portions, said intermediate portions connecting said end portions and extending transversely of said open end for flexibly bending about said sloped surface when said end portions engage said holding means whereby said resilient retainer means reacts thrustably between said holding means and said sloped surface in urging said seat against said seat support means.

2. In a valve lifter adapted to transmit valve operating thrust from a cam to a push rod, a generally cup-shaped member having a push rod seat fitting loosely therein and being thrustingly supported on a shoulder in the open end of said member, said seat having a central push rod seating portion and a conical surface extending radially therefrom, a holding means on the inside surface of said cup-shaped member between said shoulder and said open end, a normally unflexed resilient retainer extending transversely of said open end for limiting axial displacement of said seat from said shoulder, said retainer being curvingly flexed over said conical surface to engage said holding means on opposite sides of said seat whereby the flexed condition of said retainer between said holding means and said conical surface creates an axial force therebetween urging said seat against said shoulder.

3. In a mechanical valve lifter for transmitting valve operating thrust from a cam to a push rod, a generally cup-shaped member having its open end adapted to receive the adjacent end of the push rod and having an internal shoulder spaced longitudinally from said open end, a seat abuttingly engageable with said shoulder and loosely fitting said open end, said seat including a central push rod seating portion and a conical surface extending radially therefrom to the outer periphery of said seat, a groove formed on the inner surface of said cup-shaped member between said open end and said shoulder, a resilient generally rectangular snap ring extending transversely of said open end, said snap ring having edge portions and resilient straight portions interconnecting said edge portions, said edge portions bearing against said holding means and said resilient straight portions curvingly engaging said conical surface to bias said seat against said shoulder.

4. In a valve lifter for transmitting valve operating thrust from an actuator to a push rod, a generally cup shaped member having its open end adapted to receive the adjacent end of the push rod, a push rod seat including a push rod seating portion and a sloped surface adjacent the push rod seating portion, a seat supporting shoulder integrally formed within said cup shaped member, said cup shaped member having a second shoulder on its inside surface between said seat support shoulder and said open end, a resilient retainer means having opposed end portions connected to each other by intermediate portions, said end portions being disposed against said second shoulder, said intermediate portions extending transversely of said open end and being curvingly flexed about said sloped surface of said seat, said flexed intermediate portions being displaced from the plane of said end portions upon restraint of said end portions against said second shoulder to thereby apply a thrust to said sloped surfaces for maintaining said seat in engagement with said seat supporting shoulder.

5. In a valve lifter adapted to transmit valve operating thrust from a cam to a push rod, a generally cup shaped member having an open end adapted to receive the adjacent end of the push rod, said cup shaped member including a shoulder formed therein and spaced downwardly from said open end and an annular groove formed therein between said shoulder and said open end, a push rod seat having a shoulder thereon adapted to contact said shoulder on said cup shaped member, a curved surface on said push rod seat extending upwardly beyond the plane of said annular groove, a resilient spring having end portions displaced in said annular groove, and normally straight intermediate portions extending across said open cup shaped member, said intermediate portions being deflected from the plane of said angular groove about said curved surface of said seat to accommodate the insertion of said end portion in said groove, and said flexed spring being effective to thereby apply a thrust to said curved surface for continuously biasing said seat shoulder and said shoulder on said cup shaped member in contact engagement.

References Cited in the file of this patent

UNITED STATES PATENTS

| | | |
|---|---|---|
| 2,732,832 | Engemann | Jan. 31, 1956 |
| 2,734,495 | Pierce | Feb. 14, 1956 |
| 2,797,673 | Black | July 2, 1957 |
| 2,954,015 | Line | Sept. 27, 1960 |
| 3,014,472 | Wisman | Dec. 26, 1961 |